(12) United States Patent
Iwai et al.

(10) Patent No.: US 8,081,617 B2
(45) Date of Patent: Dec. 20, 2011

(54) RADIO TRANSMITTING APPARATUS AND RADIO TRANSMITTING METHOD

(75) Inventors: Takashi Iwai, Ishikawa (JP); Sadaki Futagi, Ishikawa (JP); Daichi Imamura, Kanagawa (JP); Atsushi Matsumoto, Ishikawa (JP); Yoshihiko Ogawa, Kanagawa (JP)

(73) Assignee: Panasonic Corporation, Osaka (JP)

( * ) Notice: Subject to any disclaimer, the term of this patent is extended or adjusted under 35 U.S.C. 154(b) by 544 days.

(21) Appl. No.: 12/376,002

(22) PCT Filed: Aug. 2, 2007

(86) PCT No.: PCT/JP2007/065184
§ 371 (c)(1),
(2), (4) Date: Feb. 2, 2009

(87) PCT Pub. No.: WO2008/016112
PCT Pub. Date: Feb. 7, 2008

(65) Prior Publication Data
US 2010/0002671 A1  Jan. 7, 2010

(30) Foreign Application Priority Data
Aug. 3, 2006  (JP) ................................. 2006-212546

(51) Int. Cl.
*H04B 7/216* (2006.01)
(52) U.S. Cl. ....................................... 370/342; 370/350
(58) Field of Classification Search ........................ None
See application file for complete search history.

(56) References Cited

U.S. PATENT DOCUMENTS 6,307,503 B1 * 10/2001 Liu .......................... 342/357.77
6,785,257 B1 * 8/2004 Miyatani ...................... 370/342
7,103,027 B2   9/2006 Dick
2005/0075125 A1 * 4/2005 Bada et al. .................... 455/525

FOREIGN PATENT DOCUMENTS
JP   2002-208880    7/2002
JP   2002-533008    10/2002

OTHER PUBLICATIONS

International Search Report dated Aug. 28, 2007.
3GPP TSG-RAN WG1 LTE Ad Hoc Meeting, R1-060046, Helsinki, Finland, Jan. 23-25, 2006, Source: NTT DoCoMo, NEC, Sharp, Title: "Orthogonal Pilot Channel Structure in E-UTRA Uplink," Agenda Item: 5.2.2.2, pp. 1-8.
TSG-RAN WG1 Meeting #46, R1-062175, Tallinn, Estonia, Aug. 28-Sep. 1, 2006, Source: Panasonic, NTT DoCoMo, Title: "Random access burst design for E-UTRA Agenda," Item: 8.3.1 Document for: Discussion and Decision, pp. 1-9.

* cited by examiner

*Primary Examiner* — Ricky Ngo
*Assistant Examiner* — David Oveissi
(74) *Attorney, Agent, or Firm* — Dickinson Wright PLLC (57) ABSTRACT

A radio transmitting apparatus and a radio transmitting method wherein the interference between codes can be reduced and the degradation of preamble detection capability can be prevented. According to these apparatus and method, a signature table storing part (103) that stores a table including a plurality of signatures obtained by classifying the magnitudes of propagation loss levels into levels in accordance with the distances from a base station, associating preamble detection window widths with those levels as classified, and by circularly shifting the pattern of a detection window signature #n corresponding to a signature #n to generate a signature #n+1. A signature selecting part (104) selects, based on the magnitude of a propagation loss level outputted by a propagation loss level determining part (102), one of the corresponding signatures from the signature table storing part (103) at random. A RACH signal generating part (105) uses the selected signature to generate a RACH signal.

10 Claims, 13 Drawing Sheets

| PROPAGATION LOSS LEVEL | SIGNATURE NUMBER | CAZAC SEQUENCE NUMBER | PREAMBLE DETECTION WINDOW WIDTH[usec] | CYCLIC SHIFT VALUE[usec] |
|---|---|---|---|---|
| LOW (ASSUMPTION OF CELL RADIUS < 1.5km) | #1 | CAZAC#1 | 11 (SHORT) | 0 |
| | #2 | | | 11 |
| | #3 | | | 11 |
| MEDIUM (ASSUMPTION OF CELL RADIUS < 5km) | #4 | | 33 (MEDIUM) | 11 |
| | #5 | | | 33 |
| | #6 | | | 33 |
| HIGH (ASSUMPTION OF CELL RADIUS < 10km) | #7 | | 66 (LONG) | 33 |
| | #8 | | | 66 |
| | #9 | | | 66 |
| | #10 | | | 66 |

| PROPAGATION LOSS LEVEL | SIGNATURE NUMBER | CAZAC SEQUENCE NUMBER | PREAMBLE DETECTION WINDOW WIDTH[usec] | CYCLIC SHIFT VALUE[usec] |
|---|---|---|---|---|
| HIGH | #1 | CAZAC#1 | 66(LONG) | 0 |
| MEDIUM | #2 | | 33(MEDIUM) | 66 |
| LOW | #3 | | 11(SHORT) | 33 |
| HIGH | #4 | | 66(LONG) | 11 |
| MEDIUM | #5 | | 33(MEDIUM) | 66 |
| LOW | #6 | | 11(SHORT) | 33 |
| HIGH | #7 | | 66(LONG) | 11 |
| MEDIUM | #8 | | 33(MEDIUM) | 66 |
| LOW | #9 | | 11(SHORT) | 33 |
| HIGH | #10 | | 66(LONG) | 11 |

| PROPAGATION LOSS LEVEL | SIGNATURE NUMBER | CAZAC SEQUENCE NUMBER | PREAMBLE DETECTION WINDOW[usec] |
|---|---|---|---|
| LOW (ASSUMPTION OF CELL RADIUS < 1.5km) OR SYNC-RA | #1~#9 | CAZAC#1 | 11 (SHORT) |
| MEDIUM (ASSUMPTION OF CELL RADIUS < 5km) | #10~#12 | | 33 (MEDIUM) |
| HIGH (ASSUMPTION OF CELL RADIUS < 10km) | #13~#15 | | 66 (LONG) |

FIG.12

| PROPAGATION LOSS LEVEL | SIGNATURE NUMBER | CAZAC SEQUENCE NUMBER | PREAMBLE DETECTION WINDOW[usec] | CYCLIC SHIFT VALUE[usec] |
|---|---|---|---|---|
| LOW (ASSUMPTION OF CELL RADIUS < 1.5km) | #1 REFERENCE | CAZAC#1 | 11 (SHORT) | 0 |
| | #2 | | | 11 |
| | #3 | | | 22 |
| MEDIUM (ASSUMPTION OF CELL RADIUS < 5km) | #4 | | 33 (MEDIUM) | 33 |
| | #5 | | | 66 |
| | #6 | | | 99 |
| HIGH (ASSUMPTION OF CELL RADIUS < 10km) | #7 | | 66 (LONG) | 132 |
| | #8 | | | 198 |
| | #9 | | | 264 |
| | #10 | | | 330 |

FIG.13

| PROPAGATION LOSS LEVEL | SIGNATURE NUMBER | CAZAC SEQUENCE NUMBER | PREAMBLE DETECTION WINDOW [usec] |
|---|---|---|---|
| LOW (ASSUMPTION OF CELL RADIUS < 1.5km) | #1~#3 | CAZAC#1 | 11 (SHORT) |
| MEDIUM (ASSUMPTION OF CELL RADIUS < 5km) | #4~#6 | | 33 (MEDIUM) |
| HIGH (ASSUMPTION OF CELL RADIUS < 10km) | #7~#10 | | 66 (LONG) |
| MEDIUM (ASSUMPTION OF CELL RADIUS < 5km) | #11~#22 | CAZAC#2 | 33 (MEDIUM) |
| HIGH (ASSUMPTION OF CELL RADIUS < 10km) | #23~#28 | CAZAC#3 | 66 (LONG) |

FIG.14

RADIO TRANSMITTING APPARATUS AND RADIO TRANSMITTING METHOD

TECHNICAL FIELD

The present invention relates to a radio transmitting apparatus and a radio transmission method that transmit the RACH (Random Access Channel).

BACKGROUND ART

Currently, in 3GPP RAN LTE (Long Term Evolution) studies are being conducted for a RACH transmission method. The RACH refers to an uplink channel for, for example, requesting scheduling where a mobile station uses upon transferring from idle mode to a calling step, that is, upon establishing an uplink synchronization. The RACH cannot be scheduled by a base station, and therefore a mobile station randomly selects transmission resources (e.g. frequencies, time slots and code patterns). If transmission resources overlap between a plurality of users and their RACHs collide, the base station cannot receive the RACHs successfully, and the mobile stations have to retransmit the RACHs.

In LTE, including at least a signature, which is terminal identification information, into the RACH, is studied. Moreover, as the configuration of the signatures as in W-CDMA (Wideband-Code Division Multiple Access), to improve C/N by detecting different signatures at the same time and by spreading gain, studies are conducted for separating mobile station signature numbers using signature patterns (code patterns) of good correlation characteristics.

Figure 1:
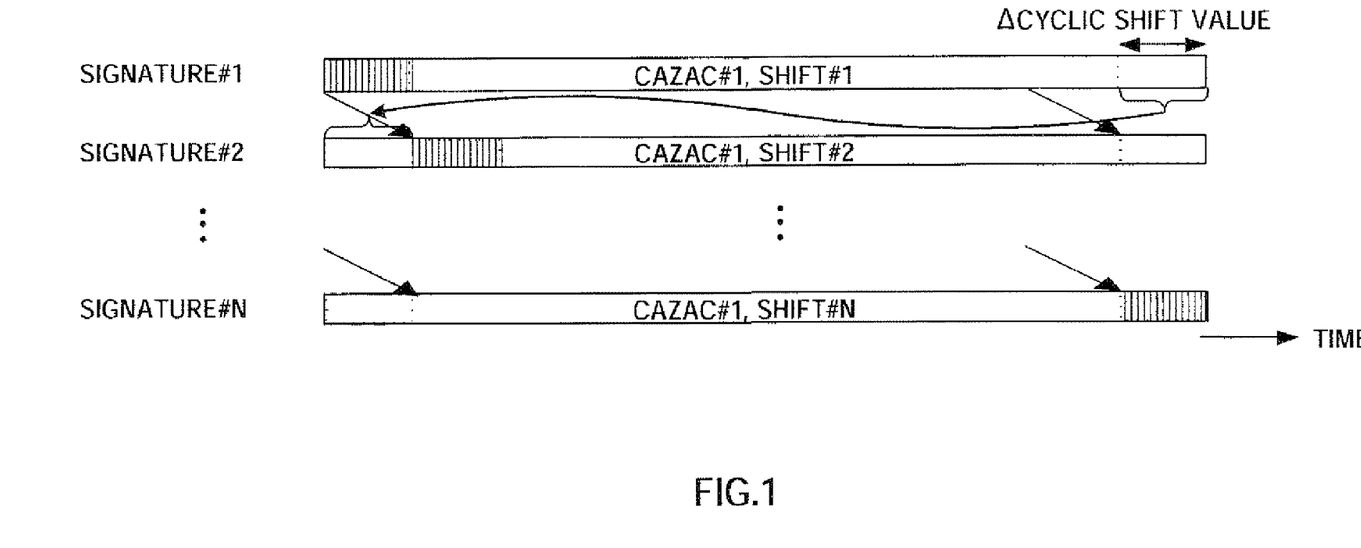
FIG. 1 illustrates the CS-CAZAC sequences disclosed in Non-patent document 1.

In a conventional RACH signature pattern, codes having good autocorrelation characteristics and cross-correlation characteristics and having low PAPS (Peak to Average Power Ratio), are used in order to detect the signatures (terminal identification information) based on correlation characteristics calculated at the receiving side. As a code sequence having these features, the cyclic shift based CAZAC (hereinafter, simply "CS-CAZAC") sequence shown in FIG. 1 is known (see non-Patent document 1). This is a code sequence obtained by cyclically shifting a CAZAC sequence, so that it is possible to detect different signatures at the receiving side at the same time by associating signature numbers with cyclic shift values. Features of CAZAC (Constant Amplitude Zero Auto-Correlation) include good autocorrelation characteristics and zero correlation between codes shifting the same code. Moreover, these CAZAC codes show relatively low cross-correlation but are not completely orthogonal.

Non-patent Document 1: 3GPP, R1-060046, NTT DoCoMo, "Orthogonal Pilot Channel Structure in E-UTRA Uplink"

DISCLOSURE OF INVENTION

Problems to be Solved by the Invention

However, when the CS-CAZAC sequence disclosed in Non-patent document 1 is used for RACH signature patterns, there is the following problem. That is, the number of signatures that can be generated from one CAZAC sequence is limited. The number of signatures that can be generated from one CAZAC sequence is calculated by the following equation 1.

The number of signatures=the length of the preamble/$\Delta$  (Equation 1)

Here, $\Delta$ is the cyclic shift value. It is necessary that the cyclic shift value is greater than the maximum propagation delay time of a mobile station. This reason is, a delay wave at a mobile station beyond the cyclic shift value may have greater correlation with a different CAZAC within a detective window of a delay profile (i.e. within the same range as the amount of cyclic shift) generated at the receiving side, and this may result in detecting wrong signatures. The maximum propagation delay time of this mobile station depends on the cell radius.

Figure 2:
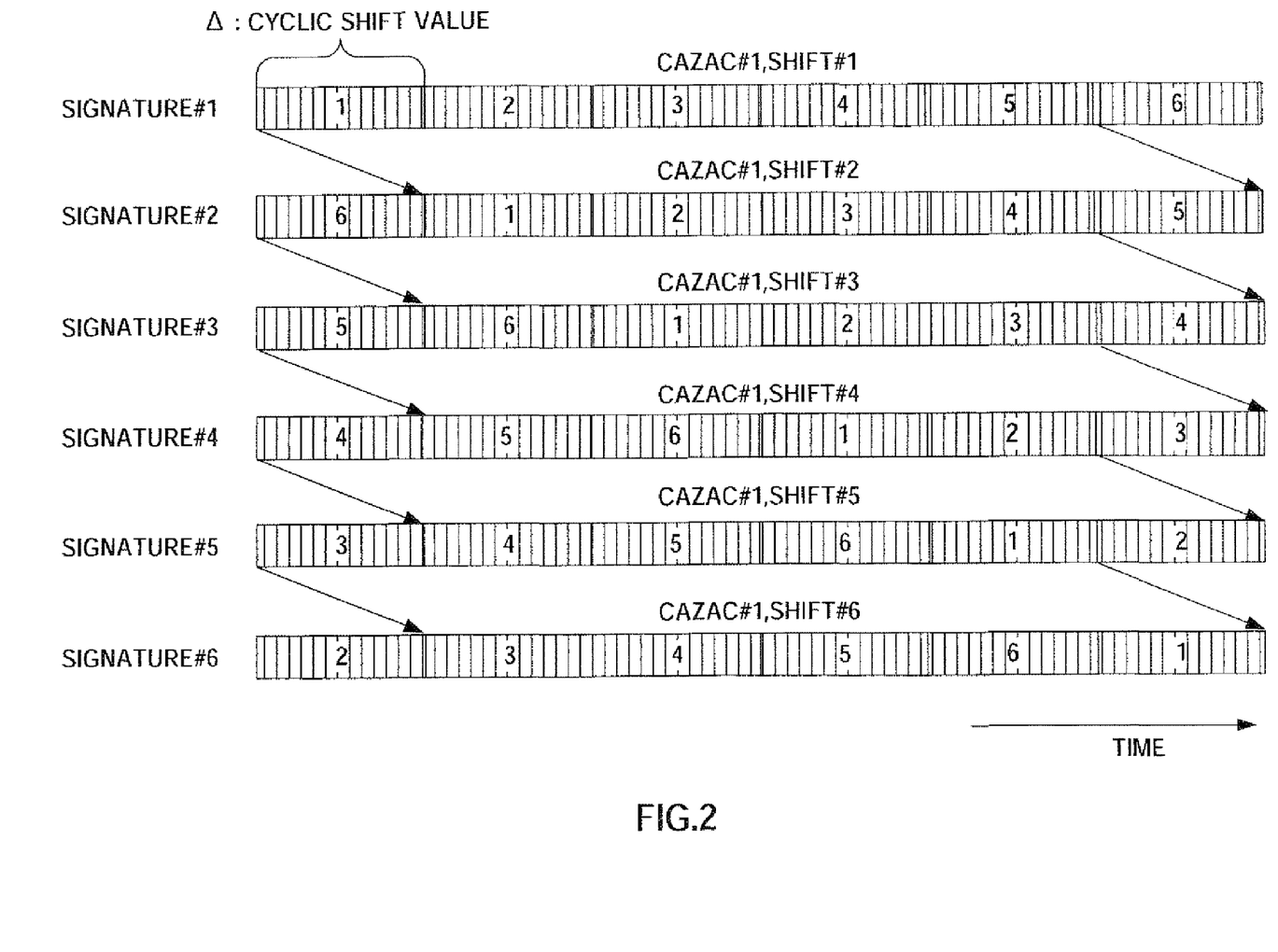
FIG. 2 illustrates how six signatures are generated from the same CAZAC sequence.

The number of signatures that can be generated from one CAZAC sequence is specifically derived. Assuming a ten kilometer cell radius, the maximum propagation delay time (i.e. round trip delay) is about sixty six microseconds. That is, $\Delta$ needs to be greater than sixty six microseconds. Moreover, assuming that the length of the preamble (the CAZAC length not including guard time) is 0.4 milliseconds as studied in LTE, as shown in FIG. 2, the number of signatures that can be generated from one CAZAC sequence is six. This number decreases when the cell radius increases, and use of only one CAZAC sequence may result in increasing the RACH collision rate.

Figure 3A:
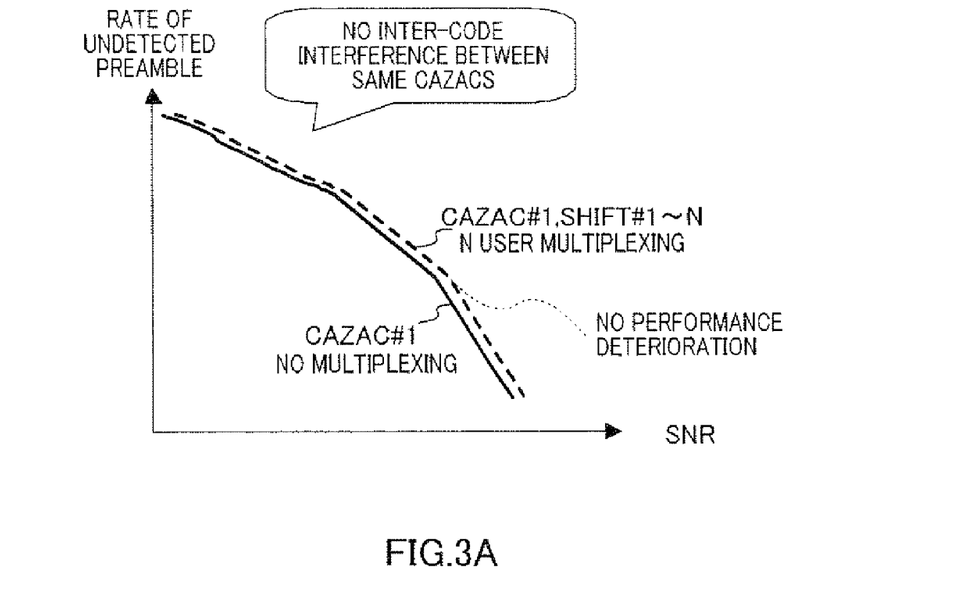
FIGS. 3A and 3B show preamble detection performance.
Figure 3B:
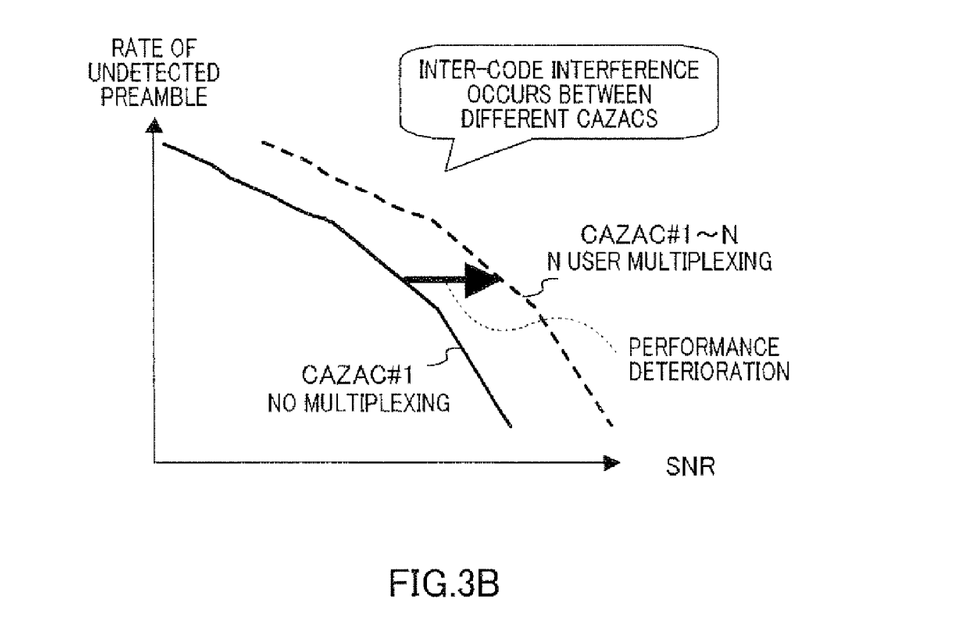

Then, to increase the number of signatures, it is possible to use different CAZAC sequences. However, as shown in the preamble detection performance in FIG. 3 with respect to two different cases where CS-CAZAC sequences of the same CAZAC sequence are multiplexed (FIG. 3A) and where different cyclic shift based CAZAC sequences are multiplexed (FIG. 3B), if different CAZAC sequences are multiplexed, inter-code interference occurs, and, consequently, preamble detection performance is deteriorated. Generally, when the number of different CAZAC sequences multiplexed increases, inter-code interference increases and signature detection performance is deteriorated.

It is therefore an object of the present invention to provide a radio transmitting apparatus and radio transmission method that can reduce inter-code interference and prevent deterioration of preamble detection performance.

Means for Solving the Problem

The radio transmitting apparatus of the present invention adopts a configuration including: an estimation section that estimates an amount of propagation delay based on a downlink signal; a selection section that, at a communicating party, associates in advance widths of detection windows for detecting preambles of random access channels with amounts of propagation delay, associates cyclic shift values for cyclic-shifting a code sequence used for signatures with the widths of the detection windows such that the signatures included in the random access channels do not overlap in the detection windows, and selects a signature generated using a cyclic shift value associated with the estimated amount of propagation delay; a generating section that generates a random access channel signal including the selected signature; and a transmission section that transmits the generated random access channel signal.

The radio transmission method of the present invention includes: an estimating step of estimating an amount of propagation delay based on a downlink signal; at a communicating party, a selecting step of associating in advance widths of detection windows for detecting preambles of random access channels with amounts of propagation delay, associating cyclic shift values for cyclic-shifting a code sequence used for signatures with the widths of the detection windows such that the signatures included in the random access channels do not overlap in the detection windows, and selecting a signature generated using a cyclic shift value associated with the estimated amount of propagation delay; a generating step of generating a random access channel signal including the selected signature; and a transmitting step of transmitting the generated random access channel signal.

Advantageous Effect of the Invention

The present invention makes it possible to reduce inter-code interference and prevent deterioration of preamble detection performance.

BRIEF DESCRIPTION OF DRAWINGS

FIG. 6 illustrates the arrangement of preamble detection windows.

BEST MODE FOR CARRYING OUT THE INVENTION

Now, embodiments of the present invention will be described in detail with reference to the accompanying drawings. Further, in embodiments, the components having the same functions will be assigned the same reference numerals and overlapping descriptions will be omitted.

Embodiment 1

Figure 4:
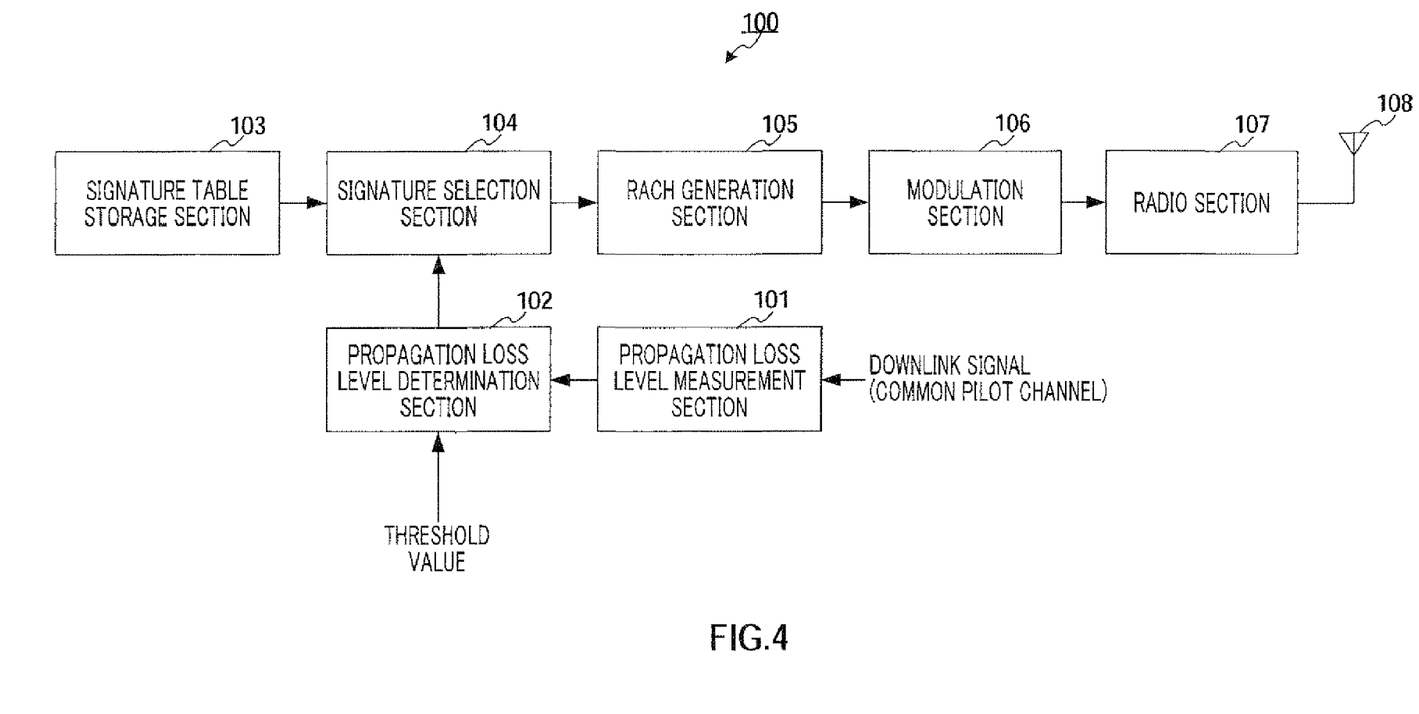
FIG. 4 is a block diagram showing the configuration of the transmitting apparatus according to Embodiment 1 of the present invention.

FIG. 4 is a block diagram showing a configuration of the transmitting apparatus according to Embodiment 1 of the present invention. In this figure, propagation loss level measurement section 101 calculates the propagation loss level (attenuation of signal power [dB]) by measuring the received power for a downlink signal (common pilot channel) and subtracting the measured received power from known transmission power. The calculated propagation loss level is outputted to propagation loss level determination section 102. The common pilot channel has its transmission power determined in advance by the system and is transmitted with fixed power.

Propagation loss level determination section 102 makes a threshold decision between the propagation loss level outputted from propagation loss level measurement section 101 and certain threshold values set in advance. Two different threshold values, threshold Th1 and threshold Th2 that is lower than Th1, are used here, and the propagation loss level is classified into three levels of high, medium and low. That is, propagation loss level determination section 102 determines that the propagation loss level is "high" if the propagation loss level is equal to or more than the threshold value Th1, determines that the propagation loss level is "medium" if the propagation loss level is equal to or more than the threshold value Th2 and less than the threshold value Th1, and determines that the propagation loss level is "low" if the propagation loss level is less than the threshold value Th2. The propagation loss level determination result (i.e. high, medium or low level) is outputted to signature selection section 104. Propagation loss level measurement section 101 and propagation loss level determination section 102 function as a propagation delay amount estimating means.

Signature table storage section 103 stores a table (i.e. signature table) that associates the propagation loss levels of "high," "medium" and "low," with respective preamble detection windows and signatures generated from CAZAC sequences. The signature table will be described later in detail.

From signature table storage section 103, signature selection section 104 randomly reads one of the signatures matching the propagation loss level determination result outputted from propagation loss level determination section 102 and outputs the read signature to RACH generation section 105.

RACH generation section 105 generates a RACH signal, in which the signature outputted from signature selection section 104 is the preamble, and outputs the generated RACH signal to modulation section 106.

Modulation section 106 modulates the RACH signal outputted from RACH generation section 105, and radio section 107 performs predetermined radio transmission processing including D/A conversion and up-conversion on the modulated RACH signal and transmits the RACH signal subjected to radio transmission processing from antenna 108.

Figure 5:
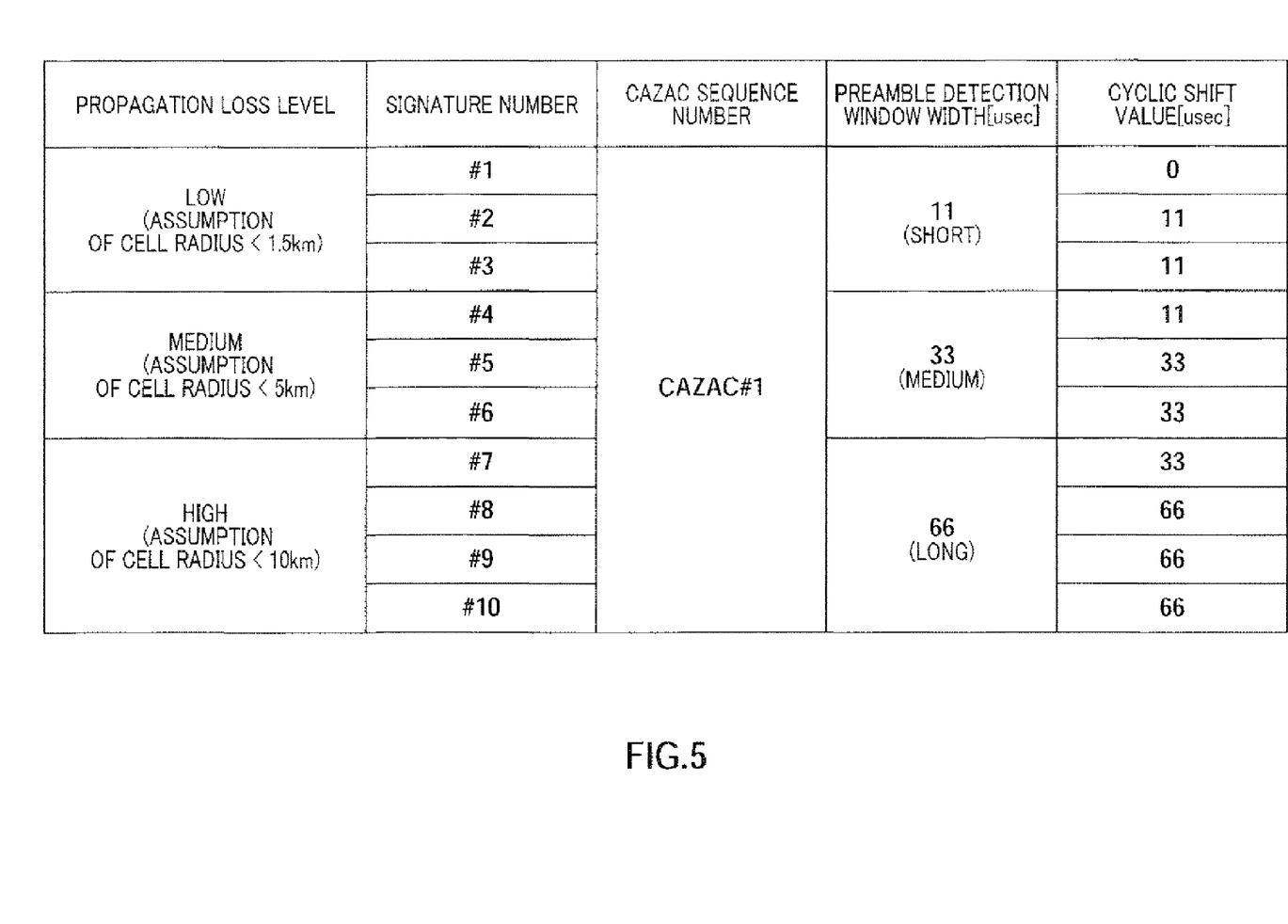
FIG. 5 illustrates the signature table held in the signature table storage section shown in FIG. 4.

FIG. 5 shows the signature table held in signature table storage section 103 shown in FIG. 4. In this figure, the "high," "medium" and "low" propagation loss levels correspond to the levels of signal power attenuation depending upon the distance from the base station. For example, the "high propagation loss level" assumes a cell radius of maximum 10 kilometers, the "medium propagation loss level" assumes a cell radius of maximum 5 kilometers and the "low propagation loss level" assumes a cell radius of maximum 1.5 kilometers.

Then, the "high," "medium" and "low" propagation loss levels are associated with respective preamble detection windows. The width of the preamble detection window is set in advance corresponding to propagation delay time estimated from the propagation loss levels. Accordingly, the width of the preamble window becomes longer when the propagation loss level is higher, and becomes shorter when the propagation loss level is lower.

Figure 6:
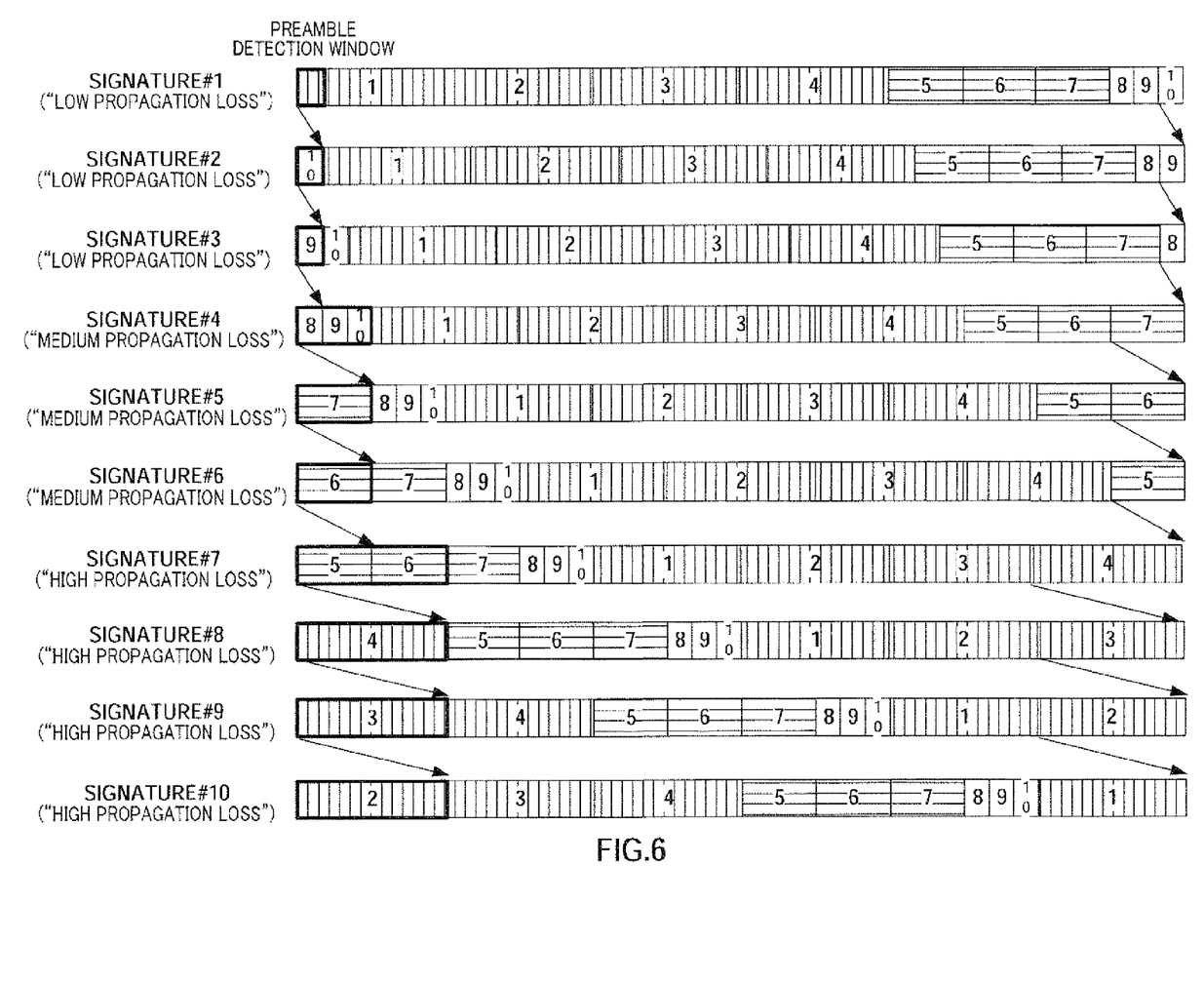
FIG. 6 shows cyclic shift values and preamble detection windows according to propagation loss levels.

Further, the cyclic shift value for generating signature #n and the preamble detection window of signature #(n−1) are the same width as shown in FIGS. 5 and 6. For example, referring to FIG. 5, the cyclic shift value for generating signature #2 is eleven microseconds, which is the width of the preamble detection window of signature #1. This makes it possible to prevent signatures from overlapping in the preamble detection window depending on the propagation loss levels. Consequently, as far as a received preamble signal is not beyond the preamble detection window set in advance, one signature does not interfere with other signatures when preambles are detected at the receiving side.

Here, the reason that the preamble detection window is shorter for lower propagation loss levels is that the amount of propagation delay can be estimated from the scale of the propagation loss level. That is, when propagation loss level is low, it is possible to estimate that the distance from the base station is short and the amount of propagation delay is little. On the other hand, estimation is more difficult when the propagation loss level is high, because it is not equally possible to determine that the distance from the base station is far. The reason is that, for example, when a mobile station is in a building, even though the distance from the base station may be short, propagation loss is likely to increase. Accordingly, when propagation loss level is high, the propagation delay time cannot be estimated, and so, assuming that the distance from the base station is far, an increased cyclic shift value is set.

Next, a method whereby signature selection section 104 selects signatures from the signature table shown in FIG. 5, will be explained. For example, when signature selection section 104 acquires a determination result specifying the "low propagation loss level" from propagation loss level determination section 102, signature selection section 104 randomly selects the signature pattern (CS-CAZAC sequence) from the signatures #1 to #3 associated with the "short preamble detection window." On the other hand, when signature selection section 104 acquires a determination result specifying the "high propagation loss level" from propagation loss level determination section 102, signature selection section 104 randomly selects the signature pattern (CS-CAZAC sequence) from the signatures #7 to #10 associated with the "long preamble detection window."

Figure 7:
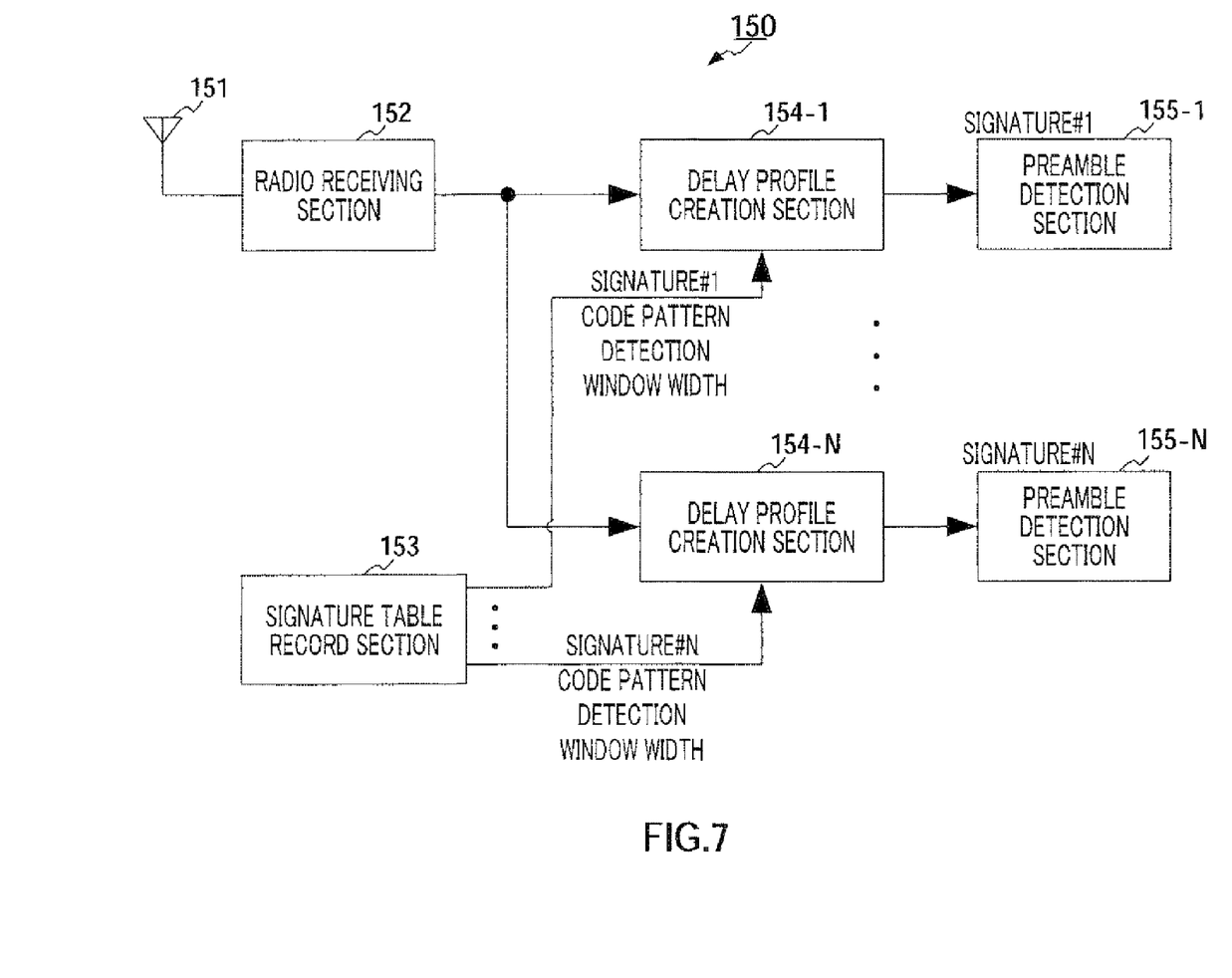
FIG. 7 is a block diagram showing the configuration of the receiving apparatus according to Embodiment 1 of the present invention.

FIG. 7 is a block diagram showing the configuration of receiving apparatus 150 according to Embodiment 1 of the present invention. Referring to this figure, radio receiving section 152 performs predetermined radio receiving processing including down-conversion and A/D conversion on the received signals via antennas 151, and outputs the signals after radio receiving processing to delay profile creation sections 154-1 to 154-N.

Signature table record section 153 sets the signature patterns fixed and stored between a transmission side and a reception side in advance and the associated preamble detection windows, in delay profile creation sections 154-1 to 154-N.

Delay profile creation sections 154-1 to 154-N calculate the correlation values between the received signal outputted from radio receiving section 152 and the signature patterns set by signature table record section 153 every reception timing and make delay profiles. Here, the range in which the delay profiles are made is the width of the preamble detection window from signature table storage section 153.

By searching for the correlation peaks within the preamble windows in the delay profiles and comparing the correlation peaks with predetermined thresholds, preamble detection sections 155-1 to 155-N perform preamble detection determination (determining whether or not there is a preamble signal of interest).

In this way, according to Embodiment 1, propagation loss levels, that is, the magnitudes of the amount of propagation delay are classified into levels depending upon the distance from the base station and are associated with preamble detection windows of widths according to the levels. Then, a signature depending on the measured propagation loss levels is selected from a table including a plurality of signatures in which signature #n+1 is generated by cyclic-shifting a pattern of signature #n with a cyclic shift value corresponding to the width of a detection window associated with signature #n, and the selected signature is used for a RACH. This increases the number of CS-CAZACs generated from one CAZAC sequence. Consequently, the number of different CAZAC sequences multiplexed can be suppressed, so that it is possible to reduce inter-code interference and improve preamble detection performance.

Figure 8:
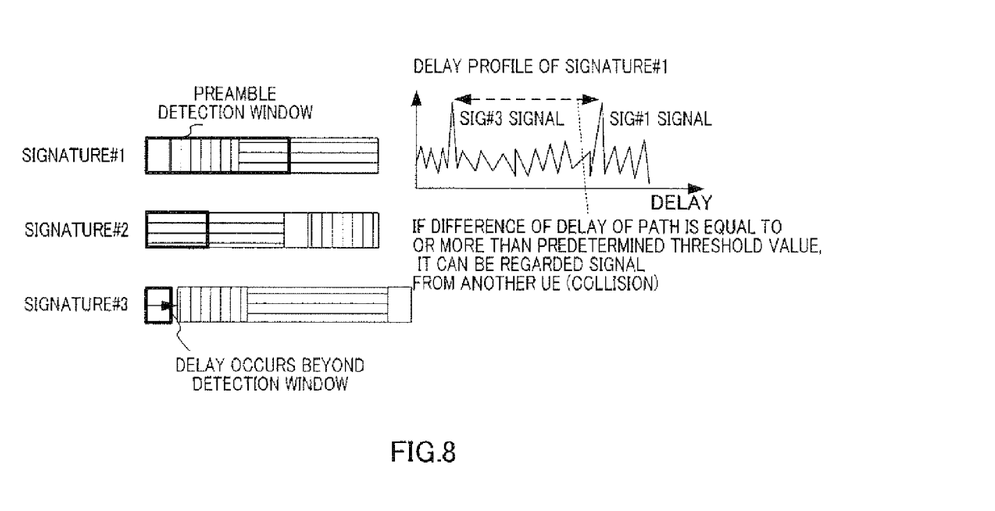

The following arrangement of the preamble detection windows of signature patterns is more preferable. That is, as shown in FIG. 8, when preamble detection windows are arranged so as to be in order from "long," "medium" and "short" with respect to signatures #1 to #3, collision detection performance is improved better than the order from "short," "medium" and "long."

Here, if the delay time of the received preamble signal from the mobile station of the "low propagation loss level" (i.e. the "short preamble detection window") appears (i.e. collides) beyond the detection window in a preamble detection window of another delay profile, the collision is easily detected. The collision is detected by for example, comparing the difference of delay between correlation peaks of the delay profile with a predetermined threshold value. That is, if the difference of delay is significant, the receiving apparatus can regard the signal as a signal from other mobile stations, and the collision can be detected.

The receiving side performs transmission timing control based on delay timings of correlation peaks of the delay profiles. If a collision occurs but cannot be detected, and if the receiving side performs transmission timing control based on a signal from other mobile stations, the receiving side cannot perform correct transmission timing control and data channel after that may interfere with other mobile stations. If the collision is detected, by returning a message of preamble detection "NG" to the mobile station, it is possible to prevent the occurrence of the above-described interference.

Figure 9:
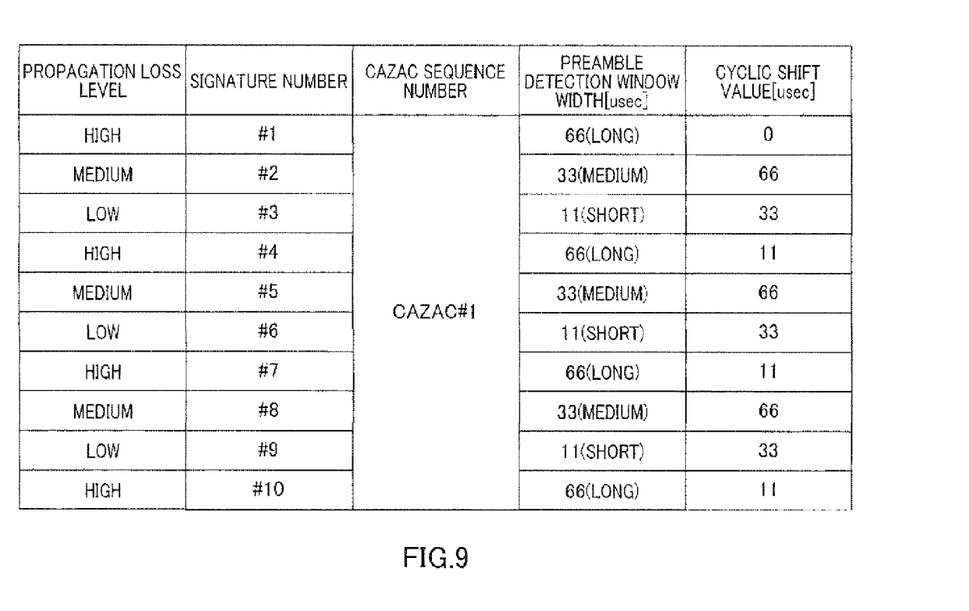
FIG. 9 illustrates a signature table based on the arrangement of preamble detection windows shown in FIG. 8.
Figure 10:
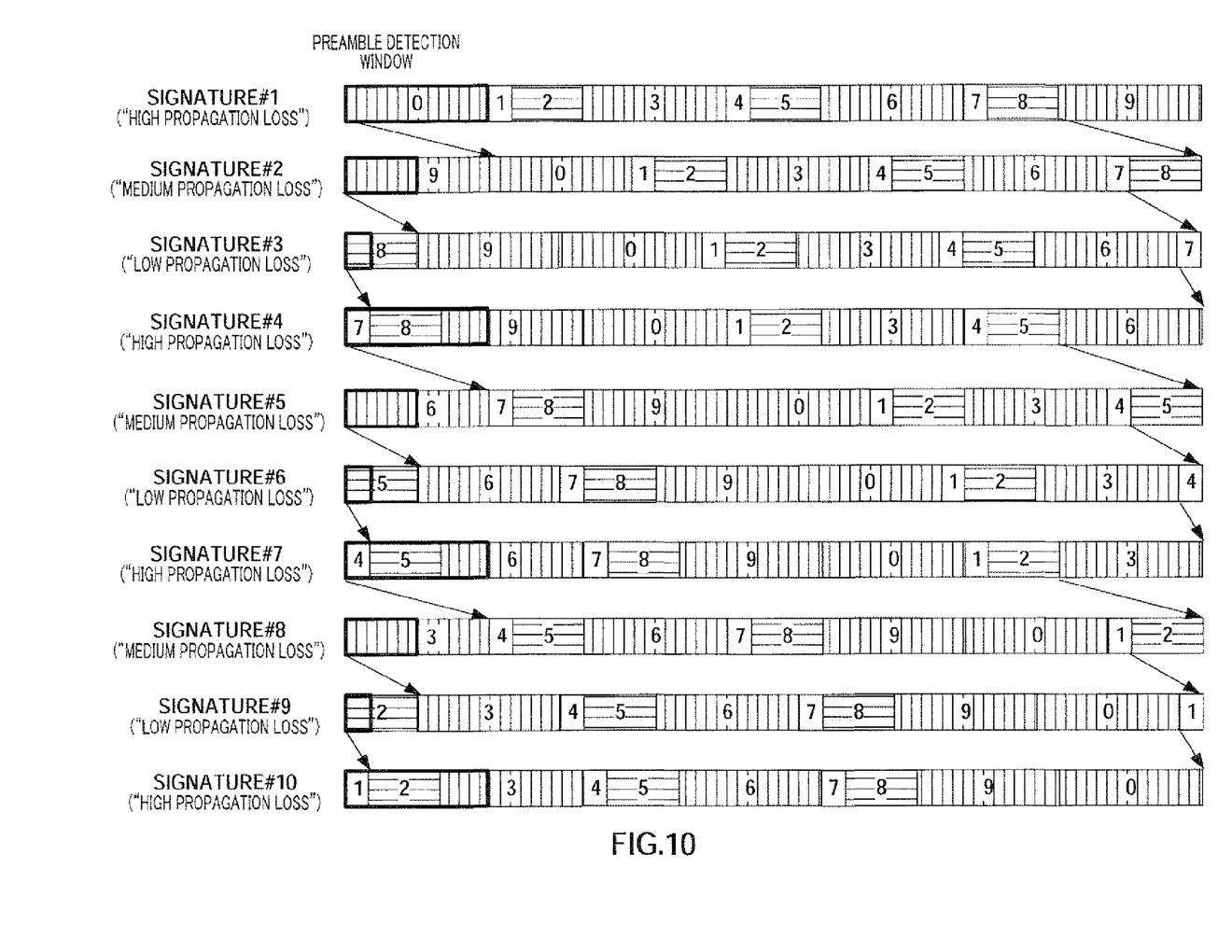
FIG. 10 shows cyclic shift values and preamble detection window based on the arrangement of preamble detection windows shown in FIG. 8.

The signatures in FIGS. 5 and 6 are arranged as in FIGS. 9 and 10 so as to be in order from the "long," "medium" and "short" preamble detection windows.

If the maximum delay time of a received signal with respect to the propagation loss levels is not beyond the preamble detection window, there is no difference in performance between the arrangements of preamble detection windows.

Embodiment 2

In LTE, studies are being conducted for a random access (Sync-RA) channel transmitted from a mobile station in a situation where uplink transmission timings are synchronized. In a Sync-RA channel, uplink synchronization is established, so that the timing error of a received signal is small regardless of the distance from the base station or the propagation loss level. That is, with Embodiment 2 of the present invention, in a case where the Sync-RA channel is used, a signature matching the "low propagation loss level" (i.e. a signature of a small cyclic shift value) is selected regardless of the propagation loss level.

Figure 11:
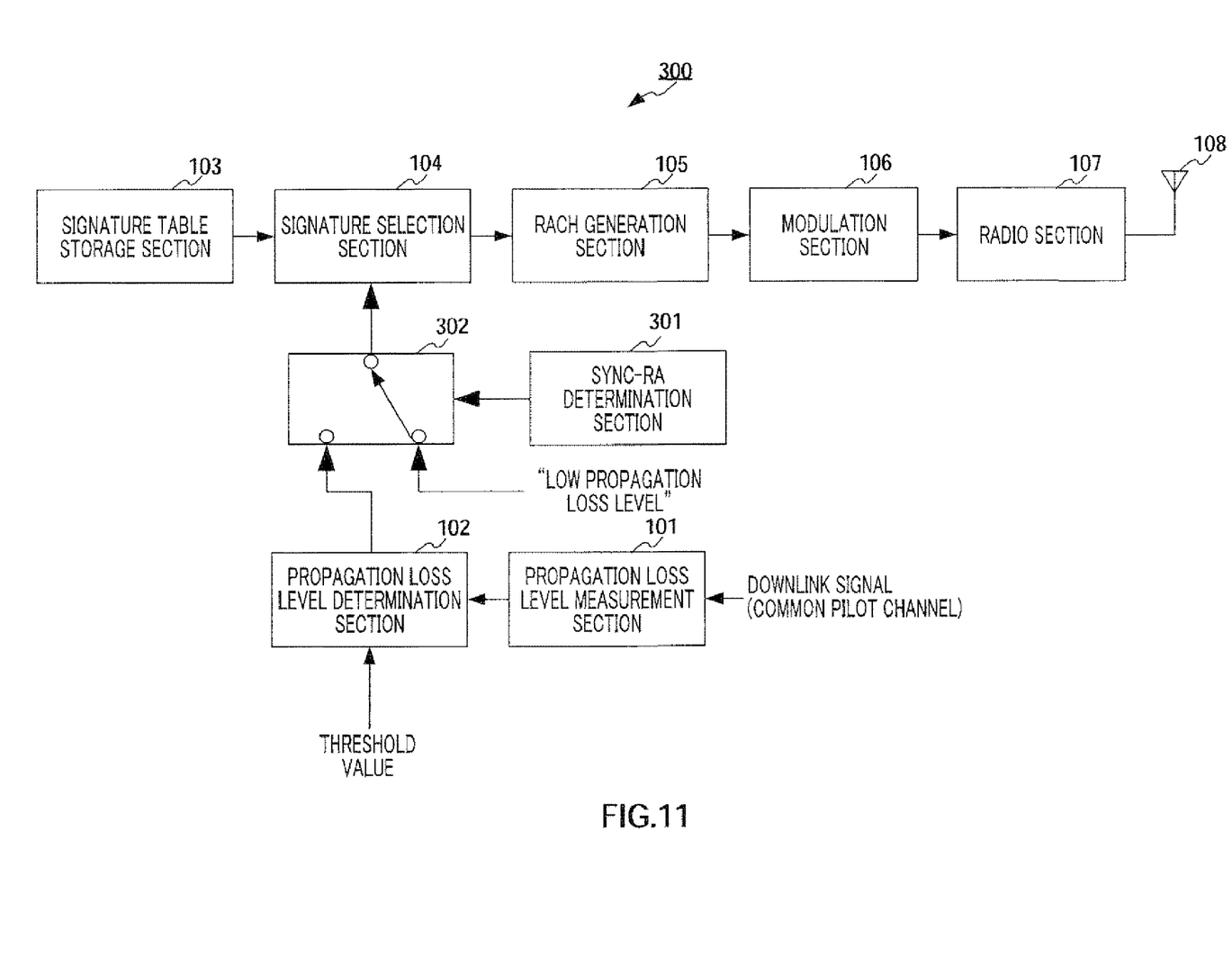
FIG. 11 is a block diagram showing the configuration of the transmitting apparatus according to Embodiment 2 of the present invention.

FIG. 11 is a block diagram showing the configuration of transmitting apparatus 300 of Embodiment 2 of the present invention. FIG. 11 is different from FIG. 4 in that Sync-RA determination section 301 and switch control section 302 are added.

Referring to FIG. 11, Sync-RA determination section 301 determines whether or not to transmit random access channel is the Sync-RA, based on whether or not its transmission timing is controlled by the base station (i.e. whether or not synchronization is established), and outputs the determination result to switch control section 302.

Figure 12:
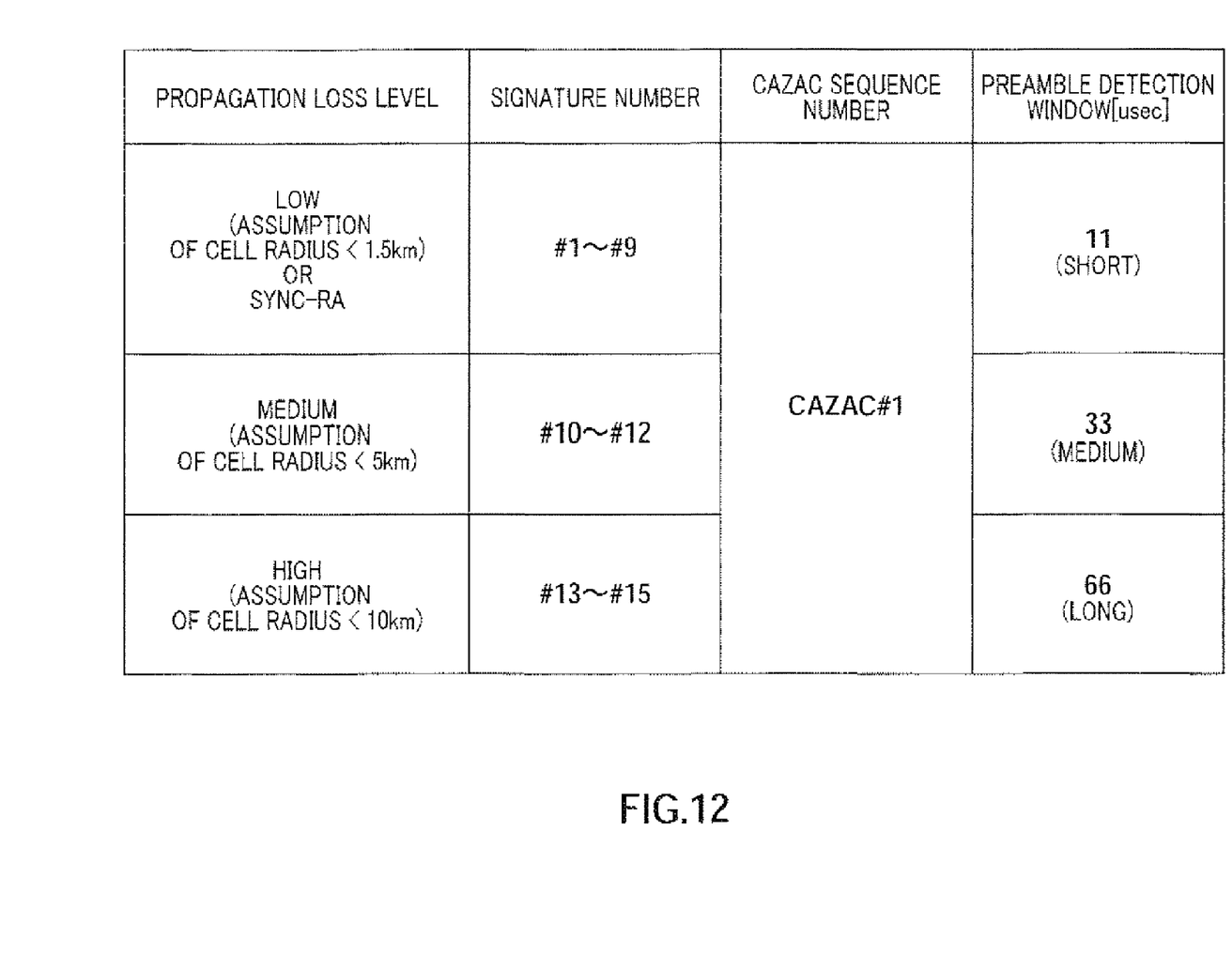
FIG. 12 illustrates the signature table according to Embodiment 2 of the present invention.

If the determination result outputted from Sync-RA determination section 301 is the Sync-RA channel, switch control section 302 does not measure the propagation loss level and outputs the "low propagation loss level" to signature selection section 104 in a fixed manner. Moreover, unless the determination result outputted from Sync-RA determination section 301 is the Sync-RA channel, switch control section 302 outputs the measured result outputted from propagation loss level determination section 102 to signature selection section 104. By this means, when the determination result is the Sync-RA channel, as shown in FIG. 12, signature selection section 104 selects the signature of the short preamble detection window.

In this way, according to Embodiment 2, in a case of Sync-RA channel is used, the signature patterns of short preamble detection window are always used. Consequently, the number of different CAZAC sequences multiplexed can be suppressed, so that it is possible to reduce inter-code interference and improve preamble detection performance.

The transmitting apparatus explained with the above embodiments is preferably provided in mobile stations in mobile communication systems.

The threshold values used in threshold decision of propagation loss levels with the above embodiments may not be fixed values. It is equally possible that the base station controls the threshold values and signals to the mobile stations in the cell the controlled threshold values as information unique to the base station through the BCH (Broadcast CHannel), and the mobile stations use the threshold values reported from the base station. This makes it possible to control the number of mobile stations for each propagation loss level and reduce the RACH collision rate transmitted from the mobile station.

The code sequences with the above embodiments may include the GCL (Generalized Chirp-Like) sequence (hereinafter, sequence c(k)).

[1]

$$c(k)=a(k)b(k \bmod m), k=0,1,\ldots,N-1 \quad \text{(Equation 2)}$$

where N is the code length, and, $N=sm^2$ (s and m are integers) or N=tm (t and m are integers). Further, a(k) is the B following "Zadoff-Chu sequence" (q is an arbitrary integer, and N and γ are coprime integers).

[2]

$$a(k)=W_N^{k(k+N \bmod 2)/2+qk}, k=0,1,\ldots,N-1 \quad \text{(Equation 3)}$$

where $W_N=\exp(j2\pi\gamma/N)$, and b(k) (k=0, ... , and m) is an arbitrary sequence of constant amplitude.

The code sequences with the above embodiments may include the Zadoff-Chu sequence (hereinafter, sequence a(k)) (q is an arbitrary integer, and N and γ are coprime integers).

[3]

$$a(k)=W_N^{k(k+N \bmod 2)/2+qk}, k=0,1,\ldots,N-1 \quad \text{(Equation 4)}$$

where $W_N=\exp(j2\pi\gamma/N)$.

Although cases have been explained with the embodiments where propagation loss levels are classified into three levels of "high," "medium" and "low," the present invention is not limited to this, and the propagation loss levels may be two and equal to or more than four.

Figure 13:
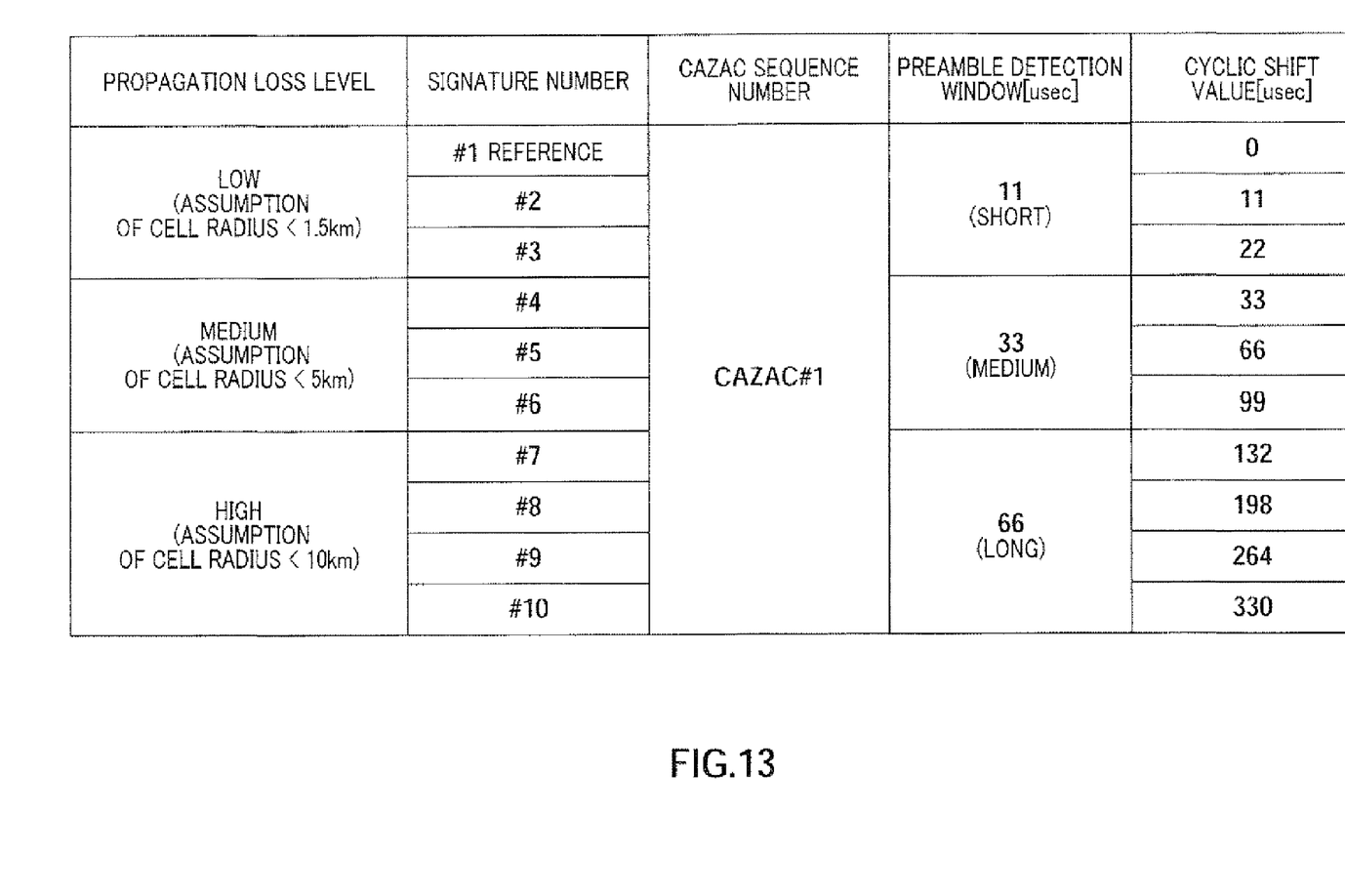
FIG. 13 illustrates the signature table by shift values with respect to reference signature patterns.

Although cases have been explained with the embodiments to define the cyclic shift value as the amount of shifts between signatures having the adjacent signature numbers, as shown in FIG. 13, the cyclic shift value may be defined as the amount of shift (i.e. absolute value) with respect to a reference signature pattern (signature #1 in FIG. 13).

Figure 14:
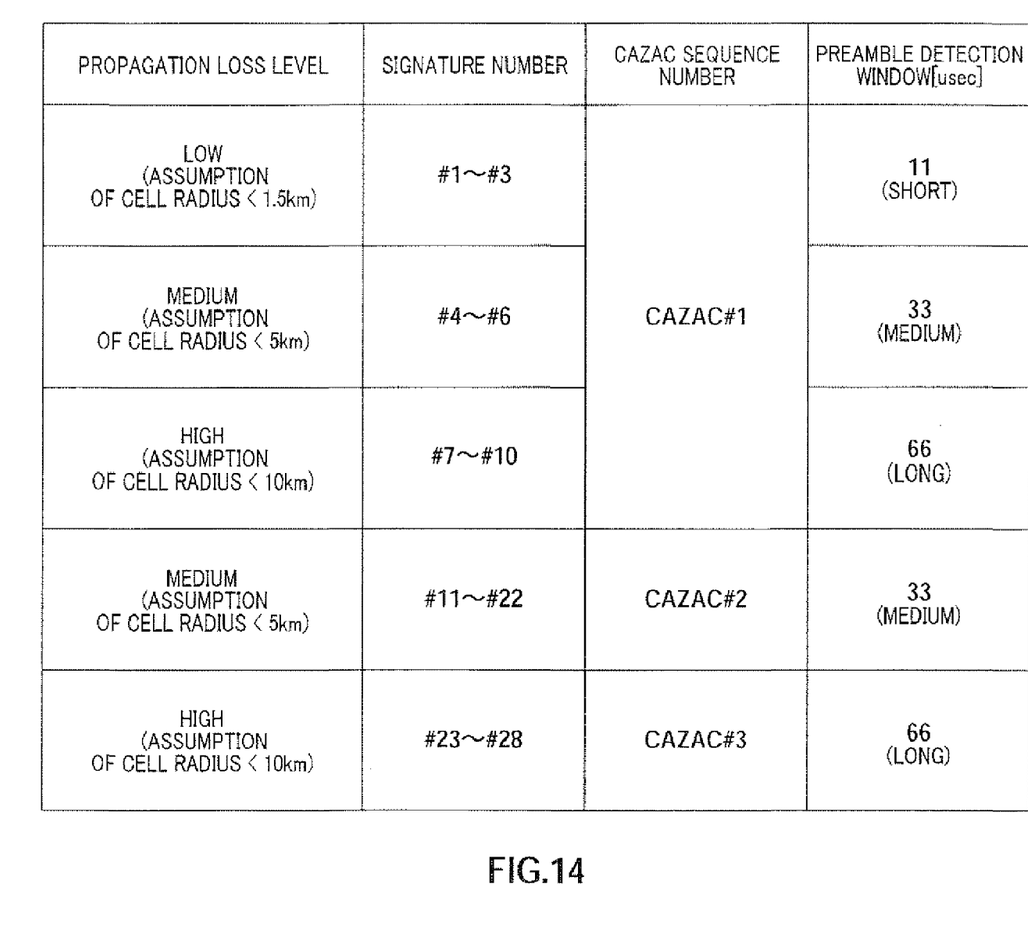
FIG. 14 illustrates the signature table using a plurality of CAZAC sequences.

Further, all CAZAC sequences used as the signature pattern are not necessary to be associated with different cyclic shift values of one CAZAC sequence (CAZAC #1). As shown in FIG. 14, these sequences may be associated with individual cyclic shift values using other CAZAC sequences (CAZAC #2 and CAZAC #3).

Moreover, although with the embodiments above cases have been described where the present invention is configured by hardware, the present invention may be implemented by software.

Each function block employed in the description of the aforementioned embodiment may typically be implemented as an LSI constituted by an integrated circuit. These may be individual chips or partially or totally contained on a single chip. "LSI" is adopted here but this may also be referred to as "IC," "system LSI," "super LSI" or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosure of Japanese Patent Application No. 2006-212546, filed on Aug. 3, 2006, including the specification, drawings and abstract, is incorporated herein by reference in its entirety.

INDUSTRIAL APPLICABILITY

The radio transmitting apparatus and the radio transmission method according to the present invention can reduce inter-code interference and prevent preamble detection performance from deteriorating, and are applicable to, for example, radio communication terminal apparatuses.

The invention claimed is:

1. A radio transmitting apparatus comprising:
   an estimation section that estimates an amount of propagation delay based on a downlink signal;
   a selection section that, at a communicating party, associates in advance widths of detection windows for detecting preambles of random access channels with amounts of propagation delay, associates cyclic shift values for cyclic-shifting a code sequence used for signatures with the widths of the detection windows such that the signatures included in the random access channels do not overlap in the detection windows, and selects a signature generated using a cyclic shift value associated with the estimated amount of propagation delay;
   a generating section that generates a random access channel signal including the selected signature; and
   a transmission section that transmits the generated random access channel signal.

2. The radio transmitting apparatus according to claim 1, wherein the selecting section selects a signature from a signature of a signature number n, and a signature of a signature number n+1 generated by cyclic-shifting a signature pattern of the signature number n by a preamble detection window associated with the signature.

3. The radio transmitting apparatus according to claim 1, wherein the estimation section measures a propagation loss level from transmission power and received power of a common pilot channel signal, which is a downlink signal, and estimates the amount of propagation delay based on the measured propagation loss level.

4. The radio transmitting apparatus according to claim 3, wherein the estimation section makes a threshold decision between the measured propagation loss level and a predetermined threshold, and classifies the measured propagation loss level into predetermined levels.

5. The radio transmitting apparatus according to claim 4, wherein the estimation section acquires a threshold controlled by a radio communication base station apparatus and makes the threshold decision using the acquired threshold.

6. The radio transmitting apparatus according to claim 1, further comprising a determination section that determines whether or not a transmitting random access is a synchronized random access based on whether or not the radio transmitting apparatus establishes synchronization with a communicating party, wherein:
when the determination result is the synchronized random access, the selection section selects a signature generated using a cyclic shift value associated with the detection window of a shortest width; and
when the determination result is other than the synchronized random access, the selection section selects a signature generated using a cyclic shift value associated with the estimated amount of propagation delay.

7. The radio transmitting apparatus according to claim 1, wherein the code sequence comprises a constant amplitude zero auto-correlation sequence.

8. The radio transmitting apparatus according to claim 1, wherein the code sequence comprises a generalized chirp like sequence.

9. The radio transmitting apparatus according to claim 1, wherein the code sequence comprises a Zadoff-Chu sequence.

10. A radio transmitting method comprising:
an estimating step of estimating an amount of propagation delay based on a downlink signal;
at a communicating party, a selecting step of associating in advance widths of detection windows for detecting preambles of random access channels with amounts of propagation delay, associating cyclic shift values for cyclic-shifting a code sequence used for signatures with the widths of the detection windows such that the signatures included in the random access channels do not overlap in the detection windows, and selecting a signature generated using a cyclic shift value associated with the estimated amount of propagation delay;
a generating step of generating a random access channel signal including the selected signature; and
a transmitting step of transmitting the generated random access channel signal.

* * * * *